United States Patent [19]

Hyman

[11] 3,726,347

[45] Apr. 10, 1973

[54] EARTH HANDLING APPARATUS

[76] Inventor: Dennis C. Hyman, 540 Fifth St., Colusa, Calif. 95932

[22] Filed: Dec. 8, 1970

[21] Appl. No.: 96,199

[52] U.S. Cl. .................. 172/666, 172/668, 172/670, 172/782, 172/190, 172/611, 37/105
[51] Int. Cl. ............................................. A01b 65/00
[58] Field of Search...................... 172/782, 783, 797, 172/207, 277, 324, 326, 452, 456, 460, 666–675, 459, 190, 743, 776; 37/105

[56] References Cited

UNITED STATES PATENTS

| | | | |
|---|---|---|---|
| 3,257,744 | 6/1966 | Buhler | 37/105 |
| 1,166,251 | 12/1915 | Phipps | 172/190 |
| 146,562 | 1/1874 | Airey | 172/670 X |
| 2,195,516 | 4/1940 | Ferguson | 172/190 |
| 3,445,944 | 5/1969 | Speno | 172/459 X |
| 3,049,822 | 8/1962 | McMullen | 172/782 X |
| 3,539,014 | 11/1970 | Jonsson | 172/666 X |
| 2,640,403 | 6/1953 | Halverson | 172/611 X |

Primary Examiner—Robert E. Pulfrey
Assistant Examiner—Stephen C. Pellegrino
Attorney—Townsend and Townsend

[57] ABSTRACT

Apparatus for mounting and moving an earth handling tool over the ground wherein a frame has a wheel at one side thereof and a beam at the opposite side, the beam being pivotally mounted on the frame and having means for carrying the tool. Power means carried by the frame is coupled with the beam for moving the same and thereby the tool into and out of operative position. The apparatus is moved forwardly by a suitable towing vehicle and the beam has means adjacent to the rear end thereof to provide lateral stability for the apparatus as it moves over the ground with the tool in any one of its operative positions.

16 Claims, 11 Drawing Figures

PATENTED APR 10 1973 3,726,347

DENNIS C. HYMAN
INVENTOR.

BY Townsend and Townsend

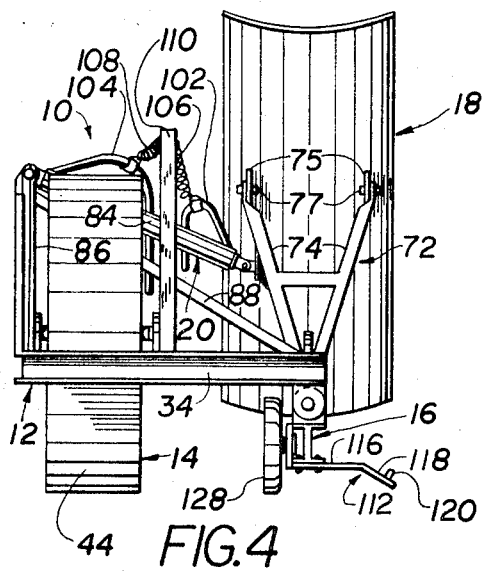
FIG.4
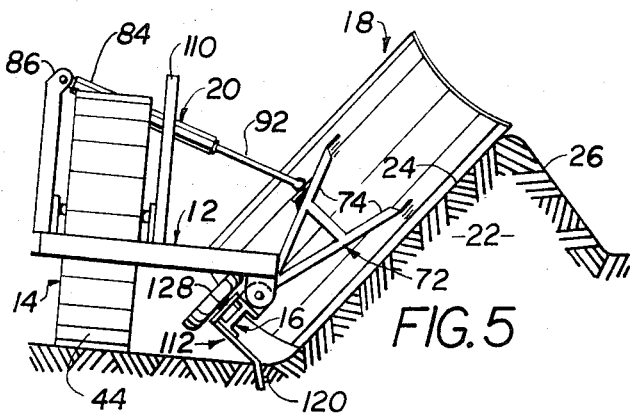
FIG.5
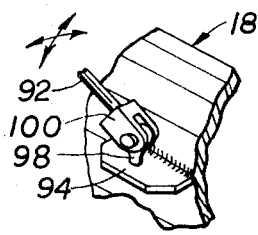
FIG.7
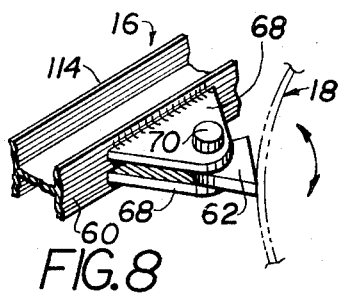
FIG.8
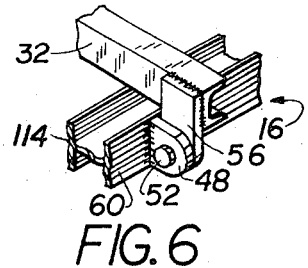
FIG.6
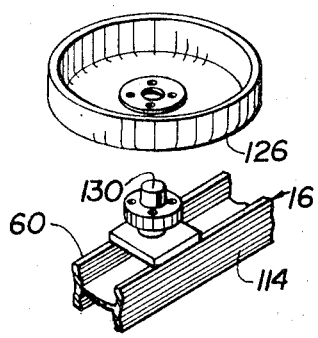
FIG.10
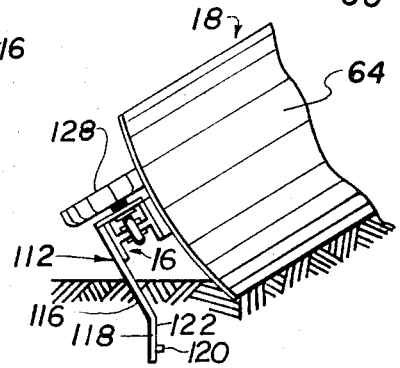
FIG.9
FIG.11
DENNIS C. HYMAN
INVENTOR.
BY
Townsend and Townsend

EARTH HANDLING APPARATUS

This invention relates to improvements in earth handling equipment, and more particularly, to apparatus for moving an earth handling tool over the ground.

While the present invention may be suitable for a number of different uses, it is especially suitable for use in forming mounds or checks which define the boundaries of a paddy for growing rice or other such crop. The checks for such a paddy have inclined sides and are of a desired height so that the paddy, when properly formed, can be filled to a desired level with water. The checks thus serve as water barriers, although one or two of the checks of a paddy can be provided with openings therethrough to allow circulation of water through the paddy, the source of the water being an adjacent paddy.

Generally, a check forms the barrier for two adjacent paddies. Thus, the opposing sides of such a check slopes downwardly from the crest thereof to the bottom surfaces of respective paddies. In forming a check, it is important that the check be of a sufficient height to permit the paddy to be filled with water to a predetermined depth. Also, after harvesting of the crop in the paddy, it is oftentimes necessary to build up an existing check by adding more soil to it to increase its height and width or to eliminate the plant growth on the side of a check.

Checks are generally used over and over again year after year. Over the years, the soil in a check becomes hard as a rock and large digging forces are required to dig into the earth at the base of a check to generate enough soil to add to the existing check to build the same to the desired dimension.

The present invention provides apparatus for mounting an earth handling tool, such as an elongated, transversely arcuate blade wherein the blade can operate when moving through the earth to generate the soil necessary to form a new check or to build up an existing check. Moreover, the apparatus is constructed so that the tool will be sufficiently supported to dig into rock-hard earth to generate the soil necessary to build up an existing check. The apparatus operates to build up the check from one side at a time; thus, after the blade has made one pass along one side of a check, it can move along the opposite side of the check so as to continue to build up the same.

In the past, a pair of earth-forming tools on opposite sides of the check have been used to form or to build up a check when the tools are pulled forwardly by towing vehicles, such as a bulldozer or tractor, moving on the crest of the check itself. Other arrangements of this type include the use of two bulldozers on the opposite sides of the check with each bulldozer pulling an earth-forming tool. Such operations require more than one person to complete a check and also require an increased investment in equipment; thus, increasing the cost of forming or building up a check.

The apparatus of the present invention overcomes this problem by operating quickly, easily and efficiently only on one side of a check without having to move the towing vehicle over the crest of the check which might otherwise damage the check itself or inhibit the formation of the same to a desired height. Thus, the apparatus can operate to form or build up one side of a check at a time so that.the step of check forming can be accomplished by making several passes along opposing sides of the check until the desired dimensions of the check are met. The apparatus can be operated by a single individual, namely, the one operating the towing vehicle. The apparatus can be readily moved from one field to another and can be adapted for other uses by replacing the earth cutting blade with tools adapted to perform the other functions.

The primary object of this invention, is therefore, to provide an improved earth handling apparatus suitable for mounting and moving an earth handling tool over the ground in an operative position and is especially adapted for use with a blade for forming or building up checks of the type used to provide the boundaries for rice paddies or the like.

Another object of this invention is to provide apparatus of the aforesaid character wherein a wheeled frame having an earth handling tool thereon is movable over the ground in such a manner that the tool can cut into the earth and form a new check or build up an existing check, yet the apparatus will provide the support for the tool sufficient to generate the forces necessary to generate the soil to form or build up the check.

A further object of this invention is to provide apparatus of the aforesaid character wherein a beam is provided to pivotally connect the tool to the frame with the beam having means thereon for providing lateral stability for the apparatus to thereby keep the blade in an operative position for generating soil to form or build up a check of the type described as the apparatus is moved forwardly along the length of each check to be formed or to be built up.

Other objects of this invention will become apparent as the following specification progresses, reference being had to the accompanying drawings for an illustration of a preferred embodiment of the apparatus.

In the drawings:

FIG. 4 is a rear elevational view of the apparatus with the blade in an inoperative position;

FIG. 5 is a rear elevational view of the apparatus, showing the blade in an operative position for forming a check for a paddy;

FIG. 6 is an enlarged, fragmentary, perspective view of the pivot attachment between the frame of the apparatus and the longitudinally extending beam which carries the blade;

FIG. 7 is an enlarged, fragmentary, perspective view of the pivot attachment between the blade and a power device on the apparatus frame;

FIG. 8 is a view similar to FIGS. 6 and 7 but showing the pivot attachment between the beam and the blade;

FIG. 9 is a view similar to FIGS. 6, 7 and 8 but showing the attachment of a blade-supporting brace to the beam;

Figure 1:
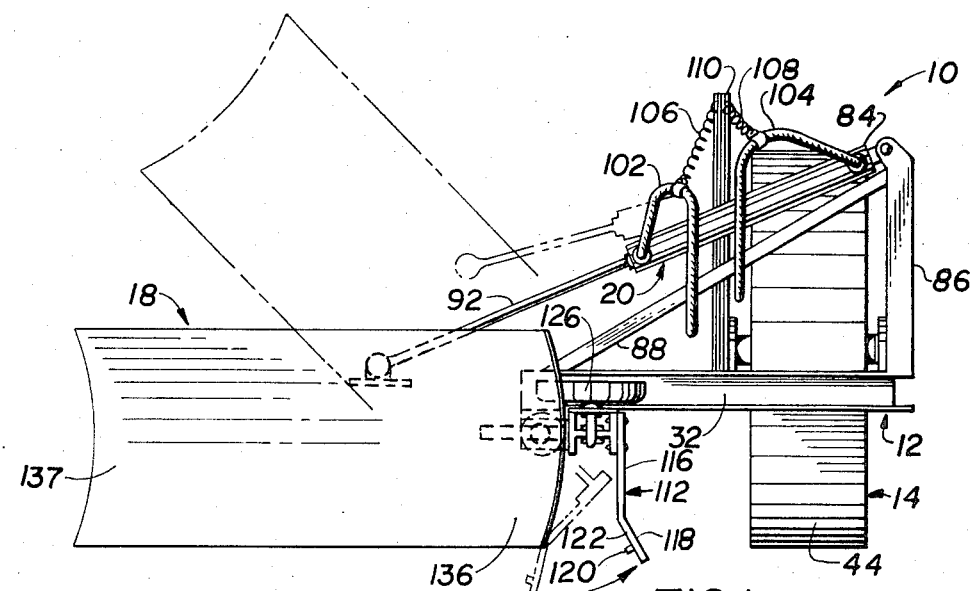
FIG. 1 is a front elevational view of the earth handling apparatus of this invention, showing an earth handling blade in two different operative positions.

FIG. 10 is an enlarged, fragmentary, perspective view of the front of the beam showing the way a wheel is attached thereto for supporting the beam when the blade is in the operative position of FIG. 4; and FIG. 11 is a rear view only of the beam, the blade and the vane on the rear end of the beam for providing lateral stability therefor to illustrate the relative positions of these three elements when the blade is in an operative position.

The apparatus of this invention is denoted by the numeral 10 and includes a frame 12 having a relatively large, ground-engaging wheel 14 journaled thereon and an elongated I-beam 16 extending longitudinally thereof with reference to the direction of movement of the frame over the ground. The beam is pivotally mounted on the frame and carries an earth handling tool, such as an earth cutting blade 18, so that, when the beam pivots relative to the frame, the blade can be moved into and out of an operative position with respect to the ground. An actuatable power device 20 carried by the frame is used to pivot the beam and thereby the blade into and out of operative positions with respect to the frame.

While the earth handling tool can be of any suitable configuration, it will be described as a blade whereby apparatus 10 can be used to form an elongated barrier or check defining a side boundary of a paddy of the type used for growing rice or other similar crop. Such a check is generally of the cross section shown in FIG. 5 and is denoted by the numeral 22. The check is conical to present a pair of sloping sides 24 and 26, FIG. 5 showing apparatus 10 in operation with blade 18 in an operative position to form or build up side 24. In such a position, the blade extends both rearwardly and upwardly from the front end of beam 16. As the blade moves forwardly with the beam along side 24 of the check, soil is dug up by the lower, forward end of the blade and the soil is distributed along the length of the blade and then onto side 24 to build up the same until check 22 is of the proper height. The angle of the blade with reference to the forward path of movement of apparatus 10 will determine the slope of side 24.

Figure 3:
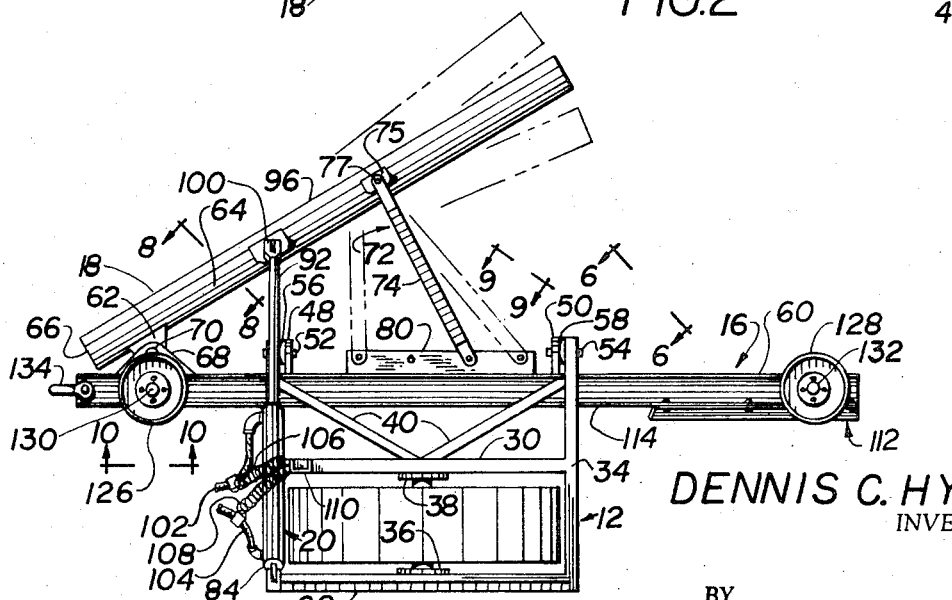
FIG. 3 is a top plan view of the apparatus.

Frame 12 includes a pair of side members 28 and 30 (FIG. 3), a front member 32 (FIG. 1), and a rear member 34 (FIGS. 3 and 4), members 28, 30, 32 and 34 being connected to each other to form a unitary, rectangular construction for the frame. Wheel 14 extends through frame 12 and is secured by bearings 36 and 38 to side members 28 and 30, respectively, whereby the frame can move with the wheel as the latter rolls over the ground. Front and rear members 32 and 34 have first ends which terminate at side member 28 but the opposite ends of members 32 and 34 are spaced laterally from side member 30, as shown in FIG. 3. Braces 40 (FIG. 3) interconnect the outer ends of members 32 and 34 with the central part of member 30.

Figure 2:
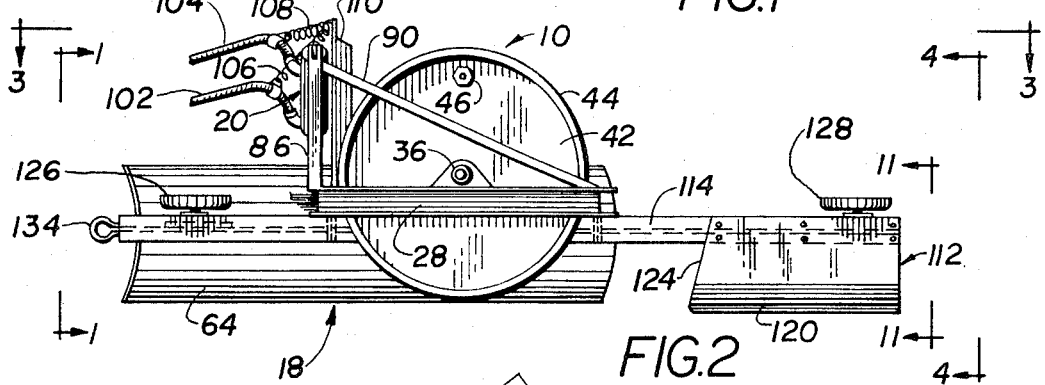
FIG. 2 is a side elevational view of the apparatus.

Wheel 14 may be of any construction but, for purposes of illustration, it is hollow and is formed by a pair of spaced sides 42, only one of which is shown in FIG. 2, and an annular band 44 having a predetermined width. Since the wheel is hollow, it can be filled with water or other suitable liquid to increase its weight. One of the sides 42 has a hole therethrough near the outer periphery of the wheel by means of which the wheel can be filled or drained. A plug 46 is removably coupled to the one side 42 for closing the hole.

Beam 16 is pivotally secured at two locations to frame 12. As shown in FIGS. 3 and 6, the beam has a pair of spaced projections 48 and 50 which are secured by pins 52 and 54 to respective, downwardly projecting extensions 56 and 58 rigid to the outer ends of front and rear members 32 and 34, respectively. Projections 48 and 50 are rigid to one outer, flat end face 60 of beam 16 as shown in FIG. 6. The axes of pins 52 and 54 are coincident with each other so as to provide a common, generally horizontal axis of pivotal movement for beam 16 relative to frame 12.

Blade 18 is transversely arcuate as shown in FIGS. 1, 4 and 7. It has a lateral projection 62 (FIGS. 3 and 8) on the rear surface 64 thereof near its forward end 66. This projection is received between a pair of ears 68 rigid to face 60 of beam 16, and a pin 70 pivotally interconnects projection 62 and ears 68. The axis of pin 70 is substantially perpendicular to but in intersecting relationship with the common axis of pins 52 and 54.

By virtue of the pivotal connection of the blade with the beam, the blade can move toward and away from the beam about pin 70. Several operative positions of the blade relative to the beam are shown in FIG. 3. To determine such operative position, a brace 72 extends between the central part of the beam and the central part of the blade as shown in FIGS. 3 and 4. Brace 72 has a pair of arms 74 (FIG. 4) which converge toward a clevis 76 attached by a pin 78 (FIG. 9) to an elongated, rigid plate 80 secured to end face 60 of beam 16 at any one of a number of operative locations along the beam. Plate 80 has a number of pin-receiving holes 82, as shown in FIGS. 3 and 9, for removably receiving pin 78 to thereby permit adjustment of the position of clevis 76 along the length of beam 16.

The opposite ends of arms 74 are pivotally secured to ears 75 on the rear surface 64 of blade 18 by pins 77 in the manner shown in FIG. 4. Brace 72 determines the acute angle between blade 18 and beam 16. To increase the angle between these two elements, clevis 76 is moved to a forward location on plate 80. To decrease this angle, clevis 76 is moved to a rearward location on plate 80. While brace 72 is shown as being of a rigid construction, the same is equivalent to a fluid-actuated power device, such as a piston and cylinder assembly which is adjustable in length and can be pivotally secured at fixed locations on both blade 18 and beam 16.

Power device 20 is fluid actuated and includes a cylinder 84 pivotally secured at one end thereof to a post 86 extending upwardly from one end of front member 32 as shown in FIG. 1. A brace 88 is rigid to the upper end of post 86 and to the opposite end of front member 32. Similarly, a brace 90 extends from the upper end of post 86 to the corresponding rear end of rear member 34 to support post 86.

A piston rod 92 is shiftably coupled with cylinder 84 and is pivotally secured to blade 18 in the manner shown in FIG. 7. To this end, the blade has a projection 94 on its rear surface 64 near one longitudinal edge 96 of the blade. Projection 92 pivotally carries a pin 98 which is coupled with a clevis 100 on the outer end of rod 92. Fluid lines 102 and 104 coupled with respective ends of cylinder 84 extend forwardly of frame 12, as shown in FIG. 3, for connection with a source of fluid under pressure, such source preferably being carried by the towing vehicle which is used to pull apparatus 10 forwardly over the ground. Lines 102 and 104 are supported by springs 106 and 108 attached to a second upright post 110 extending upwardly from the front end of side member 30.

A vane 112 is secured to the opposite outer, flat end face 114 of beam 16 at the rear end of the beam as shown in FIGS. 2 and 3. Vane 112 has a first section 116 which is parallel with face 114 and a second section 118 (FIGS. 4 and 11) which is at an angle with respect to section 116. A longitudinally extending rib 120 is carried by one face 122 of section 118 (FIG. 11). The front edge 124 of vane 112 is inclined upwardly and rearwardly with respect to the beam face 114 as shown in FIG. 2.

Beam 16 has a pair of front and rear wheels 126 and 128 journaled thereon about respective stub shafts 130 and 132 rigidly secured to one side of beam 16 in any suitable manner, such as in the manner shown in FIG. 10. The wheels are disposed to support one side of apparatus 10 as it moves over the ground with blade 18 in its up or inoperative position and when the other side of the apparatus is supported by wheel 14 in the manner shown in FIG. 4.

In use, beam 16 is secured at its front end to a towing vehicle such as a bulldozer or a tractor. To this end, the front end of the beam has a towing loop 134 to which a cable or chain can be connected. Initially, blade 18 will be in the up or inoperative position shown in FIG. 4 and the angle of the blade relative to the beam will have been determined by selectively securing brace 72 to plate 80 at any one of the operative locations along the same. In the inoperative position of blade 18, beam 16 will be disposed so that wheels 126 and 128 engage the ground to support the side of the apparatus having blade 18. Since the opposite side of the apparatus is always supported by wheel 14, the apparatus can then be pulled over the ground to a job site. When the blade is in its inoperative position, wheel 126 keeps the front end of the beam above the ground and wheel 128 keeps vane 112 above the ground; thus, the beam moves unimpeded over the ground.

At the job site, power device 20 is actuated to cause blade 18 to pivot from its inoperative position of FIG. 4 to an operative position. FIG. 1 shows the blade in two different operative positions. In the dashed line position, the blade extends upwardly and rearwardly from the front end of beam 16 and makes an acute angle with the ground. In such position, it is disposed to form or to build up a check. This is accomplished when the blade is moved forwardly because the lower extremity 136 of the blade will dig into the earth to generate loose soil which will flow upwardly along the concave front surface 137 of the blade, along the length of the blade, and finally over the top edge of the blade and off the outer end thereof. In this way, the height of the check will be increased. As the blade makes several passes along a particular side of the check, the height of the check will be progressively increased.

The blade can be placed in other angled positions to increase or decrease the degree by which the check is formed. The steeper the angle of the blade, i.e., the closer the blade is to the vertical angle, the greater will be the digging capability of the blade and thereby the greater amount of loose soil will be generated by lower extremity 136 of the blade. The change in angularity of the blade is accomplished by actuating power device 20 so that the effective length of the same is increased or decreased. Control of power device 20 is preferably achieved by the operator of the towing vehicle as apparatus 10 is being pulled forwardly over the ground.

As apparatus 10 moves over the ground with the blade in an operative position as shown in FIGS. 1 and 5, vane 112 cuts through the earth in the manner shown in FIG. 11 to provide lateral stability for the apparatus. Without the vane, the forces exerted on the blade by the soil would cause the apparatus to rotate about a vertical axis near the front end of the beam. If this were to occur, the blade would merely follow the movement of the beam and would be completely ineffective for using in forming a check or building up an existing check.

The vane because of its location on the beam inhibits any tendency for the beam to pivot about such vertical axis since the vane is in the ground when the blade is in the operative position of FIGS. 1 and 5. The vane automatically moves into and stays partially in the ground (FIG. 11) as the apparatus moves forwardly and after the power device has rotated the blade into the inclined operative position. The angularity of sections 116 and 118 provides for the holding of the vane against movement out of the ground when the blade is in an operative position. This is because lower section 118 of the vane is at an angle with respect to the applied force on the vane which tends to keep the vane in the ground and to prevent it from emerging from the ground. Rib 120 also contributes to holding the vane in the ground since it provides a shoulder which would engage the soil below ground level and thereby prevent upward movement of the vane as the apparatus moves forwardly and when blade 18 is in an operative position.

After the length of the desired check has been traversed, the operator may wish to raise the blade so as to make a 180° turn and thereby be properly aligned for making a pass along the opposite side of the check. To this end, power device 20 is actuated to draw the blade in a direction relative to and toward wheel 14. However, in some cases, the blade may have sufficiently penetrated the earth to prevent this raising of the blade immediately. Thus, when the power device is actuated, what, in fact, occurs is that the blade remains in the earth as wheel 14 is lifted off the ground. However, a point will be reached where the weight of the wheel and its liquid contents will be sufficient to dislodge the blade from the earth, causing the wheel to again settle onto the ground and carry the blade with it so as to move the blade upwardly from the earth. Then device 20 can be further actuated to raise the blade to the inoperative position of FIG. 4. This will generally be done as the apparatus moves forwardly so that vane 112 can be moved cleanly out of the ground rather than be forced upwardly through the soil about the vane.

Apparatus 10 can be used in lieu of blade 18 by attaching another tool to the beam. For instance, a disk assembly could be used as the earth handling tool wherein apparatus 10 can be moved near the base of a tree to loosen the soil around the tree and thereby eliminate the difficulty of maneuvering conventional disks around a tree for this same purpose. Also, blade 18 can be used in the full line position of FIG. 1 to level the bottom of a paddy or other area.

I claim:

1. Earth handling apparatus comprising: a frame having a pair of opposed sides and a ground engaging wheel at one side thereof for mounting the frame for movement over the ground, said wheel being the sole support of said one side of the frame; a beam shiftably mounted on the frame adjacent to the opposite side thereof and extending longitudinally thereof with reference to the path of travel of the frame, said beam having means for mounting an earth handling tool thereon and being movable into and out of any one of a number of operative positions relative to the frame; means carried by the frame for shifting the beam relative thereto, whereby the beam can be moved into and out of an operative position relative to the frame; and means on the beam for providing laterial stability therefor when the beam is in an operative position and moves over the ground with the frame.

2. Apparatus as set forth in claim 1, wherein said means for providing lateral stability comprises a vane disposed for movement through the ground when the beam is in an operative position relative to the frame.

3. Apparatus as set forth in claim 2, wherein the vane has a pair of relatively angularly disposed sections, one of the sections being rigidly secured to the beam and extending outwardly therefrom, the other section being integral with said one section.

4. Apparatus as set forth in claim 1, wherein said beam is pivotally mounted on said frame, said shifting means including a power device adapted to be pivotally coupled with said tool for pivoting the same and thereby the beam into and out of an operative position.

5. Earth handling apparatus comprising: a frame having a pair of opposed sides; a single ground-engaging wheel journaled on the frame adjacent to one side thereof and being the sole support of said one side, whereby the frame can move over the ground and be angled relative thereto; a beam pivotally mounted on the frame adjacent to the opposite side thereof and extending longitudinally of the direction of movement thereof; an earth handling tool coupled to the beam and movable therewith relative to the frame; means carried by the frame and coupled with the beam for pivoting the same relative to the frame, whereby the beam and the tool can be moved into and out of respective operative positions with respect to the frame; and means carried by the beam for holding the same against movement laterally of the direction of travel of the frame as the frame moves in said direction and when the tool and the beam are in respective operative positions.

6. Apparatus as set forth in claim 5, wherein said tool is pivotally mounted on the beam adjacent to the forward end thereof and diverging therefrom with reference to the direction of movement of the frame.

7. Apparatus as set forth in claim 5, wherein said pivoting means includes a fluid-actuated power device pivotally mounted at one end thereof to said frame and at the opposite end thereof to the tool.

8. Apparatus as set forth in claim 5, wherein said holding means includes a vane secured to the beam adjacent to the rear end thereof.

9. Earth handling apparatus comprising: a frame having a pair of opposed sides; a wheel rotatably mounted on one side of the frame for moving the same over the ground; a beam shiftably mounted on the frame adjacent to the other side thereof and extending longitudinally thereof with reference to the path of travel of the frame, said beam having means for mounting an earth handling tool thereon and being movable into and out of any one of a number of operative positions relative to the frame, said beam having means for supporting the other side of the frame when the beam is in an inoperative position relative to the frame; means carried by the frame for shifting the beam relative thereto, whereby the beam can be moved into and out of an operative position relative to the frame; and means on the beam for providing lateral stability therefore when the beam is in an operative position and moves over the ground with the frame.

10. Apparatus as set forth in claim 9, wherein said supporting means comprises a pair of wheels journaled on the beam adjacent to respective ends thereof.

11. Earth handling apparatus comprising: a frame having means thereon for mounting the same for movement over the ground; a beam shiftably mounted on the frame and extending longitudinally thereof with reference to the path of travel of the frame, said beam having means for mounting an earth handling tool thereon and being movable into and out of any one of a number of operative positions relative to the frame; means carried by the frame for shifting the beam relative thereto, whereby the beam can be moved into and out of an operative position relative to the frame; and a vane on the beam for providing lateral stability therefor and movable through the ground when the beam is in an operative position and moves over the ground with the frame, said vane having a pair of relatively angularly disposed sections, one of the sections being rigidly secured to the beam and extending outwardly therefrom, the other section being integral with said one section and having a rib thereon with the rib extending longitudinally of the beam.

12. Earth handling apparatus comprising: a frame; a hollow wheel on the frame for mounting the same for movement over the ground, said wheel having means permitting the same to be filled with a liquid and provided with an annular, ground-engaging band having a predetermined width; a beam shiftably mounted on the frame and extending longitudinally thereof with reference to the path of travel of the frame, said beam having means for mounting an earth handling tool thereon and being movable into and out of any one of a number of operative positions relative to the frame; means carried by the frame for shifting the beam relative thereto, whereby the beam can be moved into and out of an operative position relative to the frame; and means on the beam for providing lateral stability therefore when the beam is in an operative position and moves over the ground with the frame.

13. Earth handling apparatus comprising: a frame having a pair of opposed sides; ground-engaging wheel journaled on the frame adjacent to one side thereof, whereby the frame can move over the ground; a beam pivotally mounted on the frame adjacent to the opposite side thereof and extending longitudinally of the direction of movement thereof; an earth handling tool coupled to the beam adjacent to the forward end thereof with reference to the direction of movement of the frame, said tool being movable therewith relative to the frame; an adjustable brace interconnecting the tool and the beam rearwardly of the forward end of the latter; means carried by the frame and coupled with the beam for pivoting the same relative to the frame, whereby the beam and the tool can be moved into and out of respective operative positions with respect to the frame; and means carried by the beam for holding the same against movement laterally of the direction of travel of the frame as the frame moves in said direction and when the tool and the beam are in respective operative positions.

14. Earth handling apparatus comprising: a frame having a pair of opposed sides; a ground-engaging wheel journaled on the frame adjacent to one side thereof, whereby the frame can move over the ground; a beam pivotally mounted on the frame adjacent to the opposite side thereof and extending longitudinally of the direction of movement thereof; an earth handling blade coupled to the beam and movable therewith relative to the frame, said blade having a concave front surface and a front end terminating adjacent to the front end of the beam, said blade being convergent toward said beam as the front end of the blade is approached, said blade being above said beam when the latter and the blade are in respective inoperative positions; means carried by the frame and coupled with the beam for pivoting the same relative to the frame, whereby the beam and the tool can be moved into and out of respective operative positions with respect to the frame; and means carried by the beam for holding the same against movement laterally of the direction of travel of the frame as the frame moves in said direction and when the tool and the beam are in respective operative positions.

15. Earth handling apparatus comprising: a frame having a pair of opposed sides; a ground-engaging wheel journaled on the frame adjacent to one side thereof, whereby the frame can move over the ground; a beam pivotally mounted on the frame adjacent to the opposite side thereof and extending longitudinally of the direction of movement thereof; an earth handling tool coupled to the beam and movable therewith relative to the frame; means carried by the frame and coupled with the beam for pivoting the same relative to the frame, whereby the beam and the tool can be moved into and out of respective operative positions with respect to the frame; means at each end of the beam, respectively, for supporting the same for movement over the ground when the beam is in an inoperative position; and means carried by the beam for holding the same against movement laterally of the direction of travel of the frame as the frame moves in said direction and when the tool and the beam are in respective operative positions.

16. Apparatus as set forth in claim 15, wherein said supporting means includes a pair of wheels, said holding means including a vane attached to the beam near the rear end thereof, the rear wheel being operable to maintain the vane out of engagement with the ground when the beam is in an inoperative position.

* * * * *